US012610221B2

(12) United States Patent
Marlett et al.

(10) Patent No.: US 12,610,221 B2
(45) Date of Patent: Apr. 21, 2026

(54) TRANSMISSION OF ECALL INFORMATION USING INTELLIGENT INFRASTRUCTURE

(71) Applicant: AUMOVIO Systems, Inc., Auburn Hills, MI (US)

(72) Inventors: Brian J. Marlett, Macomb, MI (US); Ulrich Stählin, Eschborn (DE); Mitchell E. Clelland, Commerce Township, MI (US); Paul D. Bingham, Canton, MI (US)

(73) Assignee: Aumovio Systems, Inc., Auburn Hills, MI (US)

( * ) Notice: Subject to any disclaimer, the term of this patent is extended or adjusted under 35 U.S.C. 154(b) by 405 days.

(21) Appl. No.: 17/809,283

(22) Filed: Jun. 28, 2022

(65) Prior Publication Data

US 2023/0422012 A1     Dec. 28, 2023

(51) Int. Cl.
*H04W 4/90*       (2018.01)
*H04W 4/40*       (2018.01)

(52) U.S. Cl.
CPC ............... *H04W 4/90* (2018.02); *H04W 4/40* (2018.02)

(58) Field of Classification Search
CPC ............ H04W 4/90; H04W 4/40; H04W 4/44
See application file for complete search history.

(56) References Cited

U.S. PATENT DOCUMENTS 9,068,390 B2   6/2015   Ihlenburg
12,057,011 B2 *   8/2024   Jin ...................... H04L 63/1441

2001/0048280 A1   12/2001   Wilson
2006/0103727 A1   5/2006   Tseng
2015/0343949 A1   12/2015   Portier
2018/0262887 A1 *   9/2018   Futaki ..................... H04W 8/24
2021/0064041 A1 *   3/2021   Kim ............... B60W 30/18159

FOREIGN PATENT DOCUMENTS

CA     3098595 A1 *   11/2019   ......... G01C 21/3841
CN     101008305 A    8/2007
DE   102015221965 A1 *   5/2016   ............. H04L 67/12
WO   WO-2017082756 A1 *   5/2017   ............. H04W 4/023
WO   WO-2021254402 A1 *   12/2021   ........... G08G 1/0125

OTHER PUBLICATIONS

The International Search Report and the Written Opinion of the International Searching Authority mailed Sep. 6, 2023 on for the counterpart PCT Application No. PCT/US2023/069292.

* cited by examiner

*Primary Examiner* — Quan Zhen Wang
*Assistant Examiner* — Mancil Littlejohn, Jr.

(57) ABSTRACT

A vehicle-to-everything (V2X) emergency message transmission system for transmitting a V2X emergency message, which is received at intelligent infrastructure from a vehicle by V2X communication, to emergency services. The V2X emergency message may be transmitted from the intelligent infrastructure to provide redundancy to a cellular emergency call service and modified by the intelligent infrastructure to include additional information, which is able to be detected or provided by the intelligent infrastructure and unable to be detected by sensors of the vehicle.

7 Claims, 5 Drawing Sheets

CONTROL UNIT (410)

MEMORY (415)

419

PROCESSOR (417)

TRANSCEIVER (420)

SENSORS (430)

TRANSMISSION OF ECALL INFORMATION USING INTELLIGENT INFRASTRUCTURE

BACKGROUND

1. Field

The present application relates to vehicle safety, and more particularity to transmission of an emergency message via intelligent infrastructure.

2. Description of Related Art

The safety and security of vehicle occupants has been a priority focus for governments, agencies, manufacturers, and advocacy groups. Accordingly, many vehicle systems have been developed in response to increasing demand for vehicle systems adapted to provide improved vehicle passenger safety.

Among such systems, emergency call (eCall or e-call) systems have been developed. In an emergency call system, vehicle systems may detect that a crash has occurred, for example based on deployment of the vehicle airbag. Upon detection of the crash, cellular systems in the vehicle may automatically, or alternatively with manual or voice-activated support of a vehicle occupant, initiate a call (e.g., 911, 112, etc.) or transmit a message to emergency services indicating that the crash has occurred. For example, an emergency message may include information, such as the time at which the crash is detected, the cause or trigger prompting transmission of the emergency call or message, a location of the vehicle, and an identifier of the vehicle.

Based on the emergency call or message, first responders including police, fire personnel, ambulances, hazardous materials personnel, and the like may be more appropriately and rapidly deployed to an accident scene.

However, even though emergency call systems may be deployed in a vehicle, a drawback of such systems is the necessity of cellular transmission, for example by a telematics module of the vehicle. In certain vehicle accidents, a result of an accident may be that the telematics module becomes disabled. Accordingly, a redundancy or alternative to the conventional emergency call system may be desirable in the event that cellular systems within the vehicle unexpectedly become unavailable as a result of a crash.

SUMMARY

Aspects of embodiments of the present application relate to a vehicle-to-everything (V2X) emergency call ("eCall" or "e-call") message, a system for transmitting a V2X emergency message, and a method of transmitting a V2X emergency message via intelligent infrastructure in communication with a vehicle.

According to aspects of the embodiments, an alternative to cellular vehicle emergency call systems may be provided. Thereby, vehicle emergency call systems may leverage capabilities of intelligent infrastructure unavailable to the localized emergency call system of the vehicle.

According to aspects of the embodiments, a redundancy to cellular vehicle emergency call systems may be provided. Thereby, emergency call services may be more surely provided in the event of a serious accident in which vehicle cellular services may become disabled.

According to an aspect of an embodiment, there is provided a vehicle-to-everything (V2X) emergency message transmission system including intelligent infrastructure configured to communicate with a vehicle via V2X communication and an emergency call unit of the vehicle configured to detect a collision of the vehicle or an accident of the vehicle, generate a V2X emergency message based on detecting the collision or the accident, and transmit the V2X emergency message to the intelligent infrastructure by V2X communication.

According to an aspect of an embodiment, there is provided a vehicle-to-everything (V2X) emergency message transmission system including a sensor configured to sense information indicating a collision of a vehicle or an accident of the vehicle and an emergency message unit including a processor configured to detect the collision of the vehicle or the accident of the vehicle based on the information sensed by the sensor, and generate a V2X emergency message based on detecting the collision or the accident and a transceiver configured to transmit the V2X emergency message to intelligent infrastructure by V2X communication.

According to an aspect of an embodiment, there is provided a vehicle-to-everything (V2X) emergency message transmission system including a transceiver configured to receive a V2X emergency message from a vehicle by V2X communication and a processor configured to transmit the V2X emergency message to emergency services.

BRIEF DESCRIPTION OF THE DRAWINGS

The above and other aspects will be more clearly understood from the following brief description taken in conjunction with the accompanying drawings, in which:

FIG. 1 is a block diagram illustrating a system for transmitting a V2X emergency message, according to an embodiment;

FIG. 4 is a block diagram illustrating intelligent infrastructure for transmitting a V2X emergency message, according to an embodiment.

DETAILED DESCRIPTION

Figure 1:
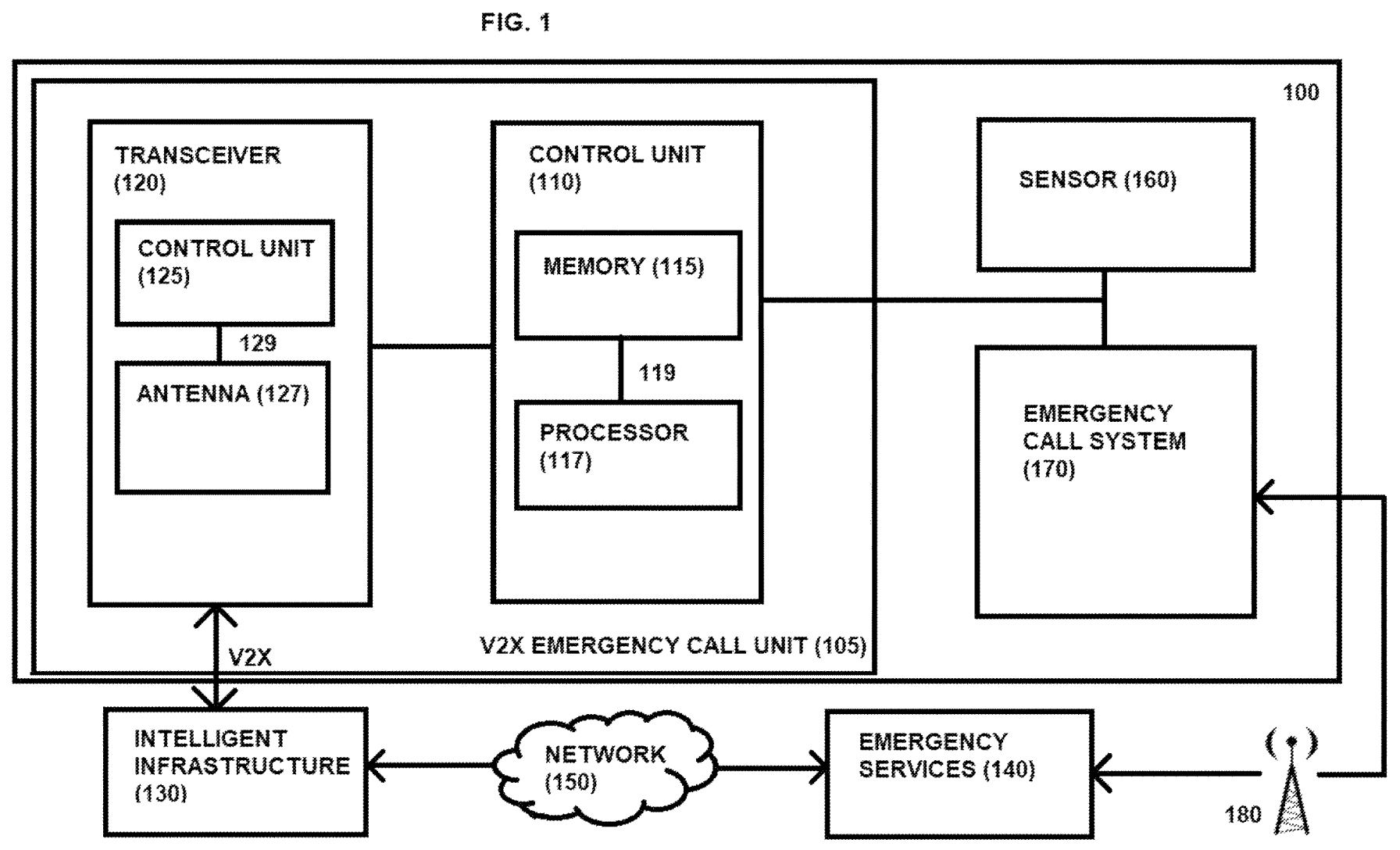
Figure 2:
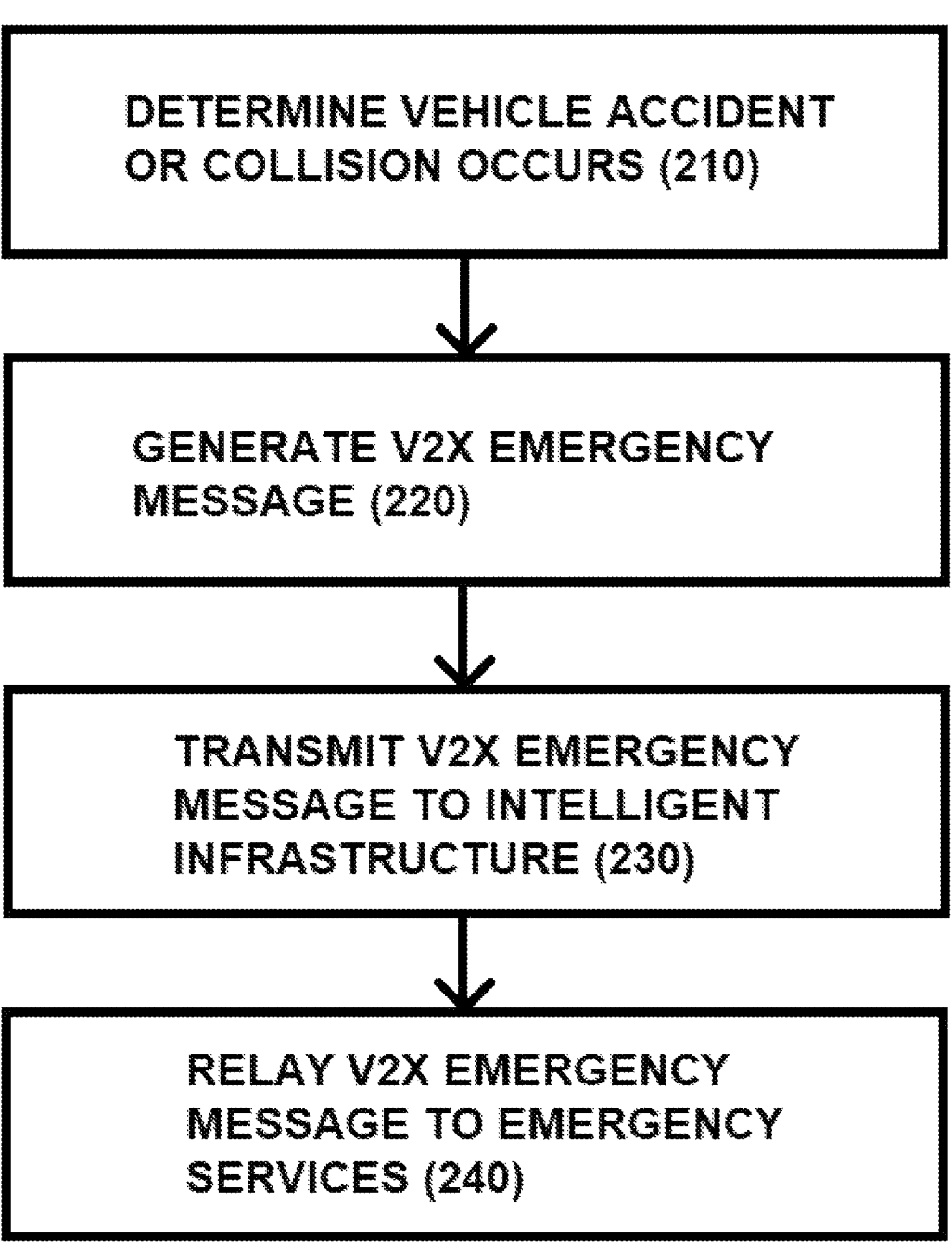
FIG. 2 is a flowchart illustrating a method of transmitting a V2X emergency message, according to an embodiment.

FIG. 1 is a block diagram illustrating a system for transmitting a V2X emergency message, according to an embodiment.

As illustrated in FIG. 1, a system for transmitting a V2X emergency message includes a V2X emergency message unit 105 of a vehicle 100. The V2X emergency message unit 105 may be integrated within a telematics unit of the vehicle 100. Alternatively, the V2X emergency message unit 105 may be provided separately from a telematics unit of the vehicle 100. For example, the V2X emergency message unit 105 may be provided separately from a telematics unit of the vehicle 100, and the V2X emergency message unit 105 may be disposed at a location, such as a trunk, on the vehicle 100 that is different from a location, such as an interior instrument cluster, of the telematics unit on the vehicle 100. Accordingly, should an impact resulting from an accident near the location of the telematics unit on the vehicle 100 disable the telematics unit of the vehicle 100, the V2X emergency message unit 105 may not become disabled due to its alternative location.

The V2X emergency message unit 105 includes a control unit 110 and a transceiver 120.

The control unit 110 includes a memory 115, processor 117, and bus 119. Although the V2X emergency message unit 105 is illustrated as including the memory 115 and processor 117 in FIG. 1, the artisan of ordinary skill will appreciate that the V2X emergency message unit 105 may include additional components for performing functions of the V2X emergency call unit 105.

The memory 115 may be random access memory (RAM), solid state or flash memory, electrically erasable programmable read-only memory (EEPROM), or any other suitable data storage element for storing data and/or operating instructions, computer-readable codes, application programming, etc. of the V2X emergency call unit 105.

The processor 117 may be a central processing unit (CPU), microprocessor, automotive microprocessor (MPU), automotive microcontroller (MCU), or other suitable data processing element for controlling operations of the V2X emergency message unit 105 by executing the operating instructions, computer-readable codes, application programming, etc. stored in the memory 115 the V2X emergency call unit 105.

The memory 115 and the processor 117 may communicate via one or more busses 119.

Although the memory 115 and processor 117 are illustrated as being embodied as separate components connected via bus 119 in FIG. 1, the artisan of ordinary skill will appreciate that the memory 115 and processor 117 may be integrated into a single component, such as an application-specific integrated circuit (ASIC) or other suitable electronic component for executing functions of the V2X emergency call unit 105.

The transceiver 120 may be communication circuitry configured to communicate between the control unit 110 of the V2X emergency message unit 105 and an intelligent infrastructure component 130, such as a roadside unit (RSU) configured to communicate via vehicle-to-everything (V2X) messaging with the vehicle 100. The transceiver 120 may be configured to communicate with the intelligent infrastructure component 130 via one or more communication protocols or standards, such as WiFi, multi-band communication, millimeter wave, or other communication technique suitable for V2X transmission and reception between the transceiver 120 and the intelligent infrastructure 130.

The transceiver 120 includes a control unit 125 and an antenna 127. Although the transceiver 120 is illustrated as including the control unit 125 and antenna 127 in FIG. 1, the artisan of ordinary skill will appreciate that the transceiver 120 may include additional components for performing communication functions of the transceiver 120.

The control unit 125 may be a central processing unit (CPU), microprocessor, or other suitable data processing element for controlling operations of the transceiver 120 by executing the operating instructions, computer-readable codes, application programming, etc. stored in the memory 115 the V2X emergency message unit 105 or the transceiver 120.

The transceiver 120 may also include memory, such as random access memory (RAM), solid state or flash memory, electrically erasable programmable read-only memory (EE-PROM), or any other suitable data storage element for storing data and/or operating instructions, computer-readable codes, application programming, etc. of the transceiver 120.

The antenna 127 may be a multi-band mobile antenna configured to support one or more communication protocols adapted for V2X communication. The antenna 127 may be an isotropic, omnidirectional, or other antenna structurally configured to transmit or receive messages configured for V2X communication.

The control unit 125 and the antenna 127 may communicate via one or more busses 129.

Although control unit 110 and the control unit 125 are illustrated as being embodied as separate components in FIG. 1, the artisan of ordinary skill will appreciate that the control unit 110 and the control unit 125 may be integrated into a single component for controlling operations of the V2X emergency call unit 105.

Intelligent infrastructure 130 may communicate with the transceiver 120 of the V2X emergency message unit 105 by V2X. Intelligent infrastructure 130 may include one or more roadside units attached to infrastructure including buildings, sidewalks, traffic lights, traffic signs, and the like. Intelligent infrastructure 130 may assist the vehicle 100 with other, non-emergency functions, such as to provide the vehicle 100 with V2X data for autonomous or semi-autonomous navigation, to identify road conditions, to identify traffic conditions, to identify information about other vehicles proximate to the vehicle 100, etc.

The vehicle 100 may include one or more sensors 160. The sensors may include vehicle sensors for performing detection localized to the vehicle 100. The sensors may include an acceleration sensor, an air bag deployment sensor, wheel speed sensors, LIDAR sensors, radar sensors, camera systems, precipitation sensors, braking sensors, etc.

The sensors 160 may be in communication with the control unit 110 of the V2X emergency message unit 105 and the emergency call system 170. The sensors 160 may communicate with the control unit 110 by wired communication or wireless communication. Although the sensors 160 are illustrated as being coupled to the control unit 110, the artisan of ordinary skill will appreciate the sensors 160 may also communicate with the transceiver 120 by wired communication or wireless communication.

The sensors 160 may output data of one or more detected conditions of the vehicle 100. For example, an air bag deployment sensor may output information indicating deployment of the air bag of the vehicle 100, a pressure from passenger impact received by the airbag of the vehicle 100, and the like. The wheel speed sensors may output information indicating the wheel speed of the vehicle 100, a rate of deceleration of the wheel speed of the vehicle 100, and the like. The LIDAR sensors, radar sensors, and camera sensors may output information indicating a number of objects proximate to the vehicle 100, a distance of objects proximate to the vehicle, and the like. The precipitation sensors may output information indicating a type of precipitation, an amount of precipitation, and the like detected by the vehicle 100. And the braking sensors may output an amount of braking force applied to the vehicle 100, a rate of increase or decrease of braking force applied to the vehicle 100, and the like.

Although a number of sensors have been described, the artisan of ordinary skill will appreciate that the vehicle 100 may include additional sensors that output information localized to the vehicle.

Based on the information output by the sensors 160, the control unit 110 may determine that a collision of the vehicle 100 to an object has occurred. Alternatively or additionally, based on the information output by the sensors 160, the control unit 100 may determine that an accident, such as a rollover, disabled tire, broken window or windshield, etc. of the vehicle 100 has occurred.

In response to detection of the vehicle collision or other accident, the control unit 110 or control unit 125 may control to form a V2X emergency message for V2X transmission to intelligent infrastructure 130. The control unit 125 may control via the antenna 127 to transmit the V2X emergency message to intelligent infrastructure 130, which may relay the V2X emergency message to emergency services 140 via one or more networks 150.

The V2X emergency message may include information provided by one or more of the sensors 160.

The intelligent infrastructure 130 may receive the emergency message transmitted by the V2X emergency call unit 105. The intelligent infrastructure 130 may modify or replace the emergency message received from the V2X emergency call unit 105.

For example, in addition to localized sensor data of the vehicle 100, the V2X emergency message modified by the intelligent infrastructure 130 may include additional information that might be unavailable or unknown to the localized sensors 160 of the vehicle 100. For example, the additional information can include a color of the vehicle 100 monitored by a camera system of the intelligent infrastructure 130, a number of vehicles involved in the collision known by the intelligent infrastructure 130 by monitoring or V2X communication, a more precise position of the vehicle determined by a position of the intelligent infrastructure 130 or determined from positions of one or more of the intelligent infrastructure according to triangulation, relative signal strength to the vehicle 100, etc., an external speed of a vehicle monitored by the intelligent infrastructure 130 colliding with the vehicle 100, and a type of object, such as pedestrian, bicyclist, animal, etc. monitored by the intelligent infrastructure 130 colliding with the vehicle 100.

Additionally, the V2X emergency message modified by the intelligent infrastructure 130 may include additional information through continuous monitoring of the vehicle 100. For example, the intelligent infrastructure 130 may continuously monitor the vehicle 100 and/or a surrounding area in the vicinity of the vehicle 100. The intelligent infrastructure 130 may thereby transmit multiple V2X emergency messages related to post crash or collision dynamics including whether pedestrians or passengers are exiting the vehicle 100 or moving in the vicinity of the vehicle, whether additional vehicles become involved in the vehicle collision as secondary collisions, and whether positions of the vehicle may continue to change as a result of a secondary collision or environmental factors such as icy roads, inclined roadways, high wind conditions, and the like.

Accordingly, as illustrated in FIG. 1, the V2X emergency message unit 105 may provide redundancy to cellular emergency call system 170 of the vehicle 100, which provides an emergency call or message to emergency services via cellular services 180 when a collision or other vehicle accident has occurred. Additionally, the V2X emergency message unit 105 and intelligent infrastructure 130 may provide a more detailed, continuously updated, and accurate emergency message than the emergency call of the emergency call system 170 owing to the additional capabilities of the intelligent infrastructure 130 beyond those of the vehicle 100 and sensors 160. The Emergency Call System 170 and the V2X Emergency Call Unit 105 may be independent units or combined into 1 unit.

FIG. 2 is a flowchart illustrating a method of transmitting a V2X emergency message, according to an embodiment.

As illustrated in FIG. 2, in step 210, a V2X emergency call system of a vehicle may monitor vehicle conditions to determine whether a collision or other accident of the vehicle occurs.

In response to determining that a collision or other accident of the vehicle has occurred in step 210, the V2X emergency call system may generate a V2X emergency message, in step 220. The V2X emergency message may include sensor information of the vehicle, or other information locally able to be detected by the vehicle.

In step 230, the V2X emergency message may be transmitted from the vehicle to intelligent infrastructure by V2X messaging.

In step 240, the V2X emergency message received from the vehicle may be relayed from intelligent infrastructure to emergency services.

Figure 3:
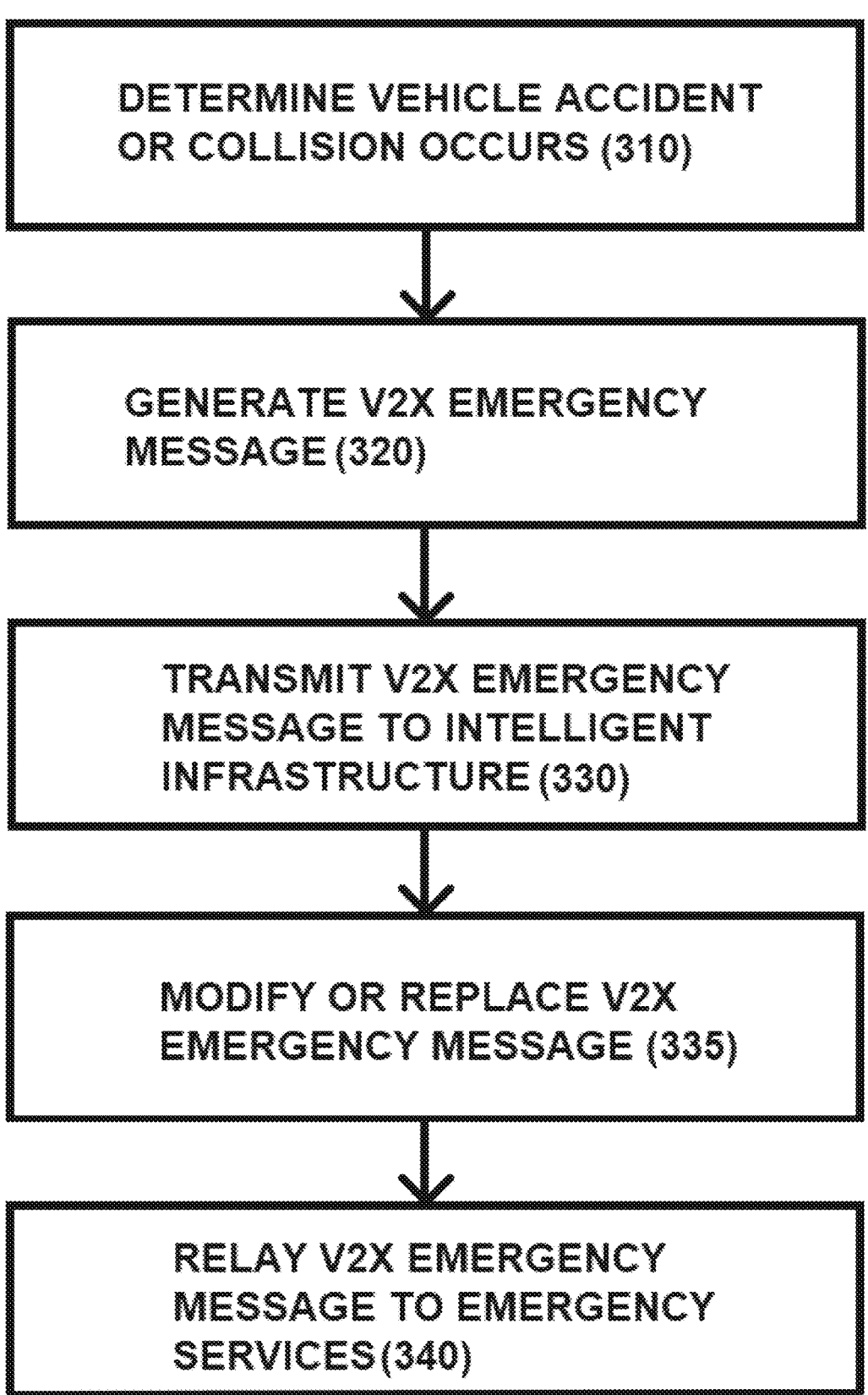
FIG. 3 is a flowchart of a method of transmitting a V2X emergency message, according to an embodiment.

FIG. 3 is a flowchart illustrating a method of transmitting a V2X emergency message, according to an embodiment.

As illustrated in FIG. 3, in step 310, a V2X emergency call system of a vehicle may monitor vehicle conditions to determine whether a collision or other accident of the vehicle occurs.

In response to determining that a collision or other accident of the vehicle has occurred in step 310, the V2X emergency call system may generate a V2X emergency message, in step 320. The V2X emergency message may include sensor information of the vehicle, or other information locally able to be detected by the vehicle.

In step 330, the V2X emergency message may be transmitted from the vehicle to intelligent infrastructure by V2X messaging.

In step 335, the V2X emergency message may be modified or replaced by the intelligent infrastructure. For example, in addition to localized sensor data of the vehicle, the V2X emergency message modified by the intelligent infrastructure may include additional information unavailable or unknown to the localized sensors of the vehicle. Here, the V2X emergency message may be an initial V2X emergency message triggered by collision or accident of the vehicle.

In step 350, the V2X emergency message, which is either received from the vehicle or modified by intelligent infrastructure, may be relayed from intelligent infrastructure to emergency services. As described above, the intelligent infrastructure may additionally continue to monitor the vehicle and the environment of the vehicle. Based on conditions dynamically changing after initial detection of the vehicle collision or accident, additional V2X emergency messages may be provided from the intelligent infrastructure to emergency services.

Figure 4:
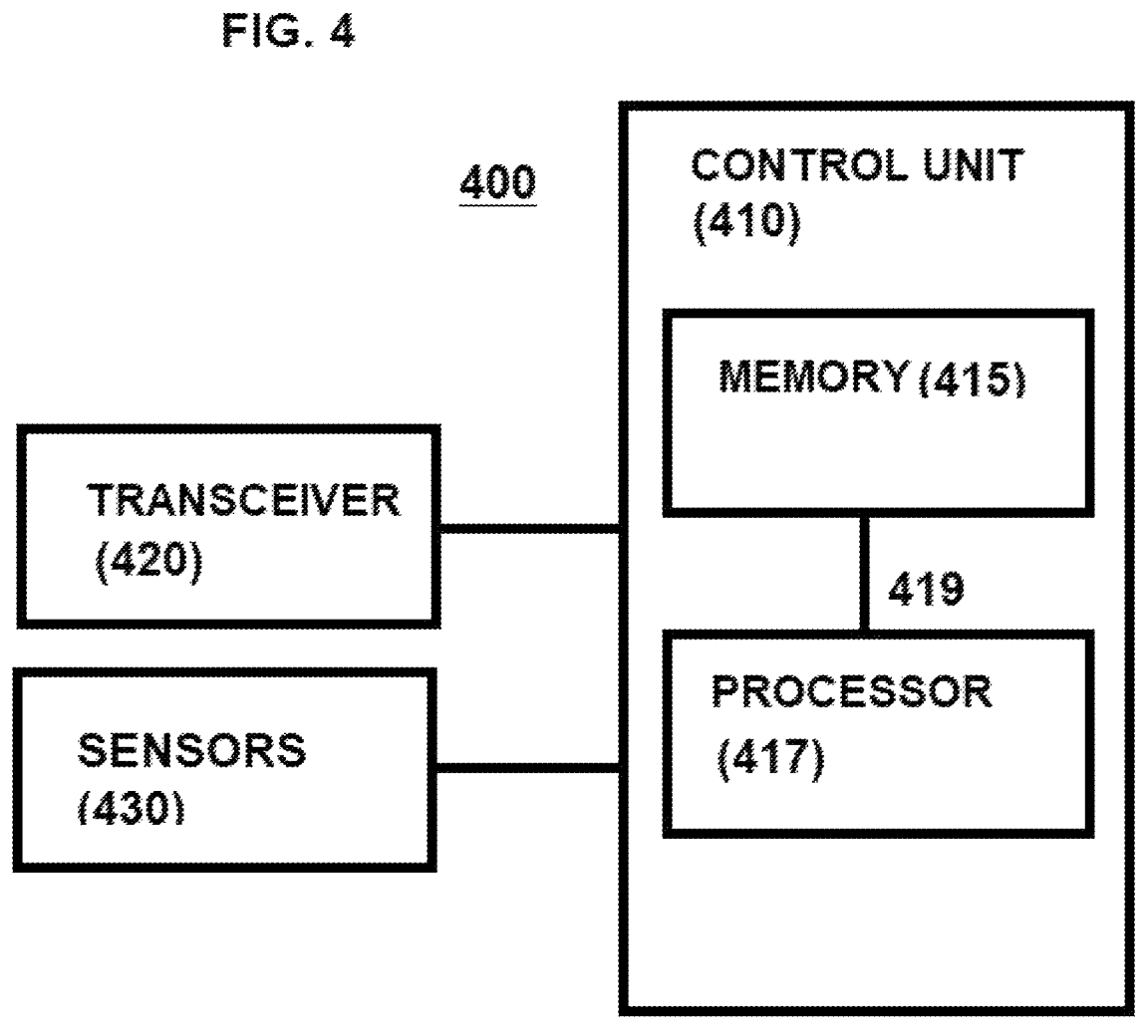

FIG. 4 is a block diagram illustrating intelligent infrastructure for transmitting a V2X emergency message, according to an embodiment.

The intelligent infrastructure 400 may be embodied as the intelligent infrastructure 130 described with respect to FIG. 1. As illustrated in FIG. 4, the intelligent infrastructure includes a control unit 410, a transceiver 420, and sensors 430.

The control unit 410 includes a memory 415, processor 417, and bus 419. Although the control unit 410 is illustrated as including the memory 415, processor 417, and bus 419 in FIG. 4, the artisan of ordinary skill will appreciate that the control unit 410 may include additional components for performing functions of the intelligent infrastructure 400.

The memory 415 may be random access memory (RAM), solid state or flash memory, electrically erasable programmable read-only memory (EEPROM), or any other suitable data storage element for storing data and/or operating instructions, computer-readable codes, application programming, etc. of the intelligent infrastructure 400.

The processor 417 may be a central processing unit (CPU), microprocessor, or other suitable data processing element for controlling operations of the intelligent infrastructure 400 by executing the operating instructions, computer-readable codes, application programming, etc. stored in the memory 415 the intelligent infrastructure 400.

The memory 415 and the processor 417 may communicate via one or more busses 419.

Although the memory 415 and processor 417 are illustrated as being embodied as separate components connected via bus 419 in FIG. 4, the artisan of ordinary skill will appreciate that the memory 415 and processor 419 may be integrated into a single component, such as an application-specific integrated circuit (ASIC) or other suitable electronic component for executing functions of the intelligent infrastructure 400.

The transceiver 420 may be communication circuitry configured to communicate between the control unit 410 of intelligent infrastructure 400 and a vehicle, such as the vehicle 100 described with respect to FIG. 1.

The intelligent infrastructure 400 may be a roadside unit (RSU) configured to communicate via vehicle-to-everything (V2X) messaging with the vehicle. The transceiver 420 may be configured to communicate with the vehicle via one or more communication protocols or standards, such as WiFi, multi-band communication, millimeter wave, or other communication technique suitable for V2X transmission and reception between the transceiver 420 and the vehicle.

The transceiver 420 includes a control unit and an antenna. Although the transceiver 420 may include a control unit and antenna, the artisan of ordinary skill will appreciate that the transceiver 420 may include additional components for performing communication functions of the intelligent infrastructure 400.

The antenna may be a multi-band mobile antenna configured to support one or more communication protocols adapted for V2X communication. The antenna may be an isotropic, omnidirectional, or other antenna structurally configured to transmit or receive messages configured for V2X communication.

Intelligent infrastructure 400 may communicate by V2X with a V2X emergency call unit of a vehicle.

Intelligent infrastructure 400 may include one or more roadside units attached to infrastructure including buildings, sidewalks, traffic lights, traffic signs, and the like. Intelligent infrastructure 400 may assist the vehicle with other, non-emergency functions, such as to provide the vehicle with V2X data for autonomous or semi-autonomous navigation, to identify road conditions, to identify traffic conditions, to identify information about other vehicles proximate to the vehicle, etc.

The intelligent infrastructure 400 may include one or more sensors 430. The sensors 430 may include various sensors for performing detection of objects, an environment surrounding the intelligent infrastructure, and the like. The sensors may include LIDAR sensors, radar sensors, camera systems, etc.

The sensors 430 may be in communication with the control unit 410. The sensors 430 may communicate with the control 410 by wired communication or wireless communication.

The sensors may output data of one or more detected conditions. For example, LIDAR sensors, radar sensors, and camera systems may detect and track objects, such as pedestrians, bicyclists, animals, vehicles, buildings, signage, roadways, and the like within a field of view of the sensors 430. Although a number of sensors have been described, the artisan of ordinary skill will appreciate that the intelligent infrastructure 400 may include additional sensors that output information detected by the intelligent infrastructure 400 and associated with a collision or accident of one or more objects monitored by intelligent infrastructure 400.

Based on the information output by the sensors 430, the control unit 410 may determine that a collision of a vehicle to an object has occurred. Alternatively or additionally, based on the information output by the sensors 410, the control unit 410 may determine that an accident, such as a rollover, disabled tire, broken window or windshield, etc. of a vehicle has occurred. Still alternatively or additionally, the control unit 410 may determine that an accident or collision of one or more vehicles has occurred based on the transceiver 420 receiving a V2X emergency message from the one or more vehicles.

In response to detection of the vehicle collision or other accident, or reception of the V2X emergency message from the one or more vehicles, the control unit 410 may control to form a V2X emergency message for V2X transmission to emergency services, such as the emergency services 140 via one or more networks 150 described with respect to FIG. 1.

The V2X emergency message may include information provided by one or more of the sensors of the vehicle. In response to receiving the V2X emergency message, the control unit 410 may modify or replace the emergency message received from the vehicle.

For example, in addition to localized sensor data of the vehicle, the V2X emergency message modified by the intelligent infrastructure 400 may include additional information unavailable or unknown to the localized sensors of the vehicle. For example, the additional information can include a color of the vehicle monitored by a camera system of the intelligent infrastructure 400, a number of vehicles involved in the collision known by the intelligent infrastructure 400 by monitoring or V2X communication, a more precise position of the vehicle determined by a position of the intelligent infrastructure 400 or determined from positions of one or more of the intelligent infrastructure according to triangulation, relative signal strength to the vehicle, etc., an external speed of a vehicle monitored by the intelligent infrastructure 400 colliding with the vehicle, and a type of object, such as pedestrian, bicyclist, animal, etc. monitored by the intelligent infrastructure 400 colliding with the vehicle.

As also described above, the intelligent infrastructure 400 may continuously monitor the vehicle, other objects in a vicinity of the vehicle, and the surrounding environment of the vehicle to detect dynamically changing conditions. Accordingly, the intelligent infrastructure 400 may transmit additional emergency messages with respect to the conditions that may change subsequent to detection of the vehicle collision event or accident event.

Figure 5:
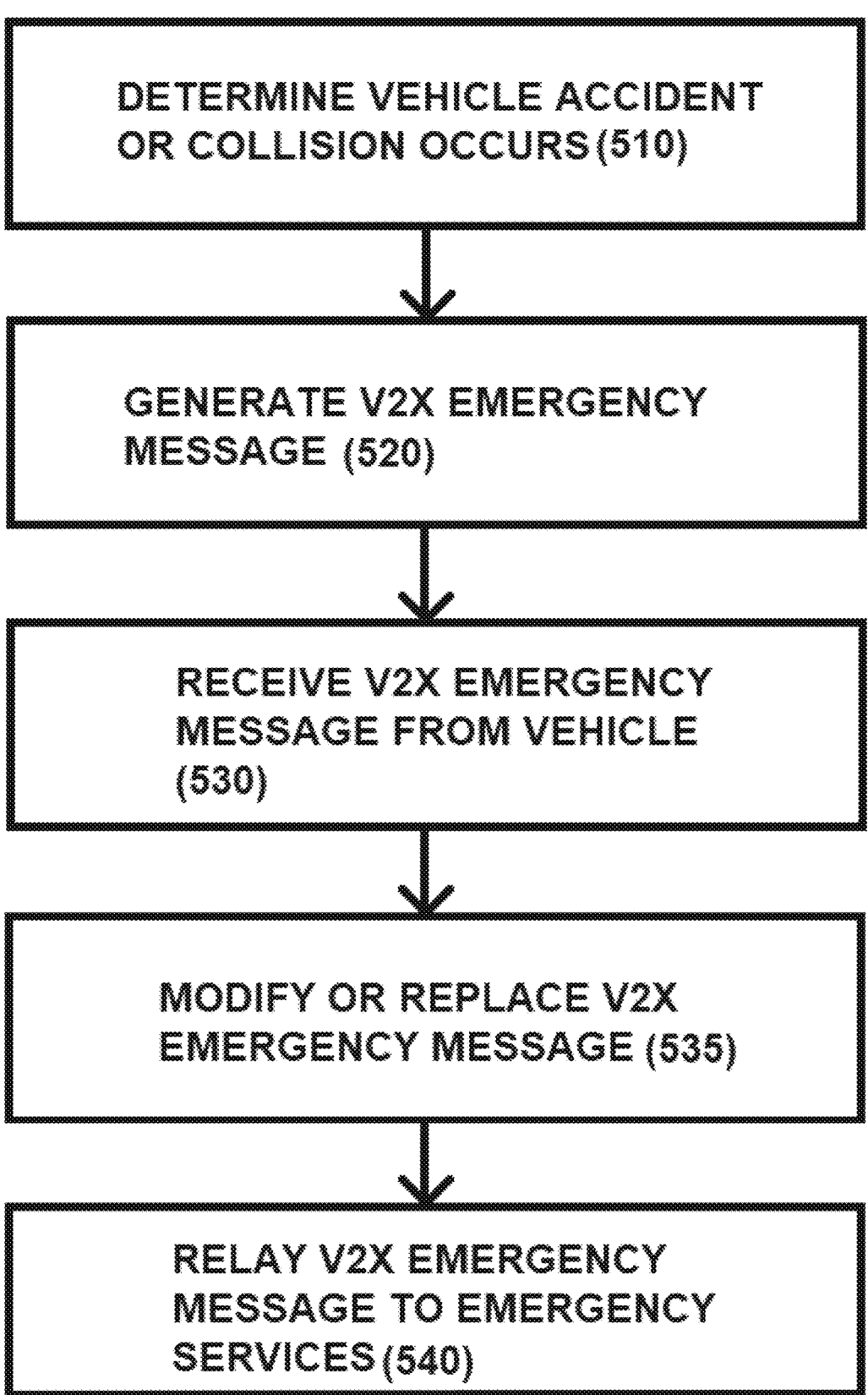
FIG. 5 is a flowchart illustrating a method of transmitting a V2X emergency message, according to an embodiment.

FIG. 5 is a flowchart illustrating a method of transmitting a V2X emergency message, according to an embodiment. The method of FIG. 5 may be performed by intelligent infrastructure, such as intelligent infrastructure 400 described with respect to FIG. 4.

As illustrated in FIG. 5, in step 510, intelligent infrastructure may determine that a collision or other accident of a vehicle occurs. For example, based on the information output by the sensors of the intelligent infrastructure, the intelligent infrastructure may determine that an accident, such as a rollover, disabled tire, broken window or windshield, etc. of a vehicle has occurred. Alternatively or additionally, the intelligent infrastructure may determine that an accident or collision of one or more vehicles has occurred based on the intelligent infrastructure receiving a V2X emergency message from the one or more vehicles.

In response to determining that a collision or other accident of the vehicle has occurred in step 510, the intelligent infrastructure may generate a V2X emergency message, in step 520.

In step 530, a V2X emergency message may be received from the vehicle by V2X messaging. The V2X emergency message may include sensor information of the vehicle.

In step 535, the V2X emergency message may be modified or replaced by the intelligent infrastructure. For example, in addition to localized sensor data of the vehicle, the V2X emergency message modified by the intelligent infrastructure may include additional information unavailable or unknown to the localized sensors of the vehicle.

In step 550, the V2X emergency message, which is either received from the vehicle or modified by intelligent infrastructure or generated by intelligent infrastructure in step 520, may be relayed from intelligent infrastructure to emergency services.

As also described above, the intelligent infrastructure may continuously monitor the vehicle, other objects in a vicinity of the vehicle, and the surrounding environment of the vehicle to detect dynamically changing conditions. Accordingly, the intelligent infrastructure may transmit additional emergency messages with respect to the conditions that may change subsequent to detection of the vehicle collision event or accident event.

Aspects of the embodiments described herein may be implemented as computer programs written as computer-executable codes or instructions, whether compiled or uncompiled. The computer programs may be recorded on one or more computer-readable media, such as disk, CD-ROM, or other memory, such as RAM, ROM, flash or solid state memory, etc. Upon execution of the computer programs by a processor, microprocessor, or other processing device, the processor may control a device, such as a V2X emergency call unit of a vehicle or intelligent infrastructure to control processing and transmission of a V2X emergency message to emergency services.

Accordingly, an alternative to cellular vehicle emergency call systems may be provided and a vehicle emergency call system may leverage capabilities of intelligent infrastructure unavailable to the localized emergency message of the vehicle.

Moreover, a redundancy to cellular vehicle emergency call systems may be provided. Thereby, emergency call services may be more surely provided in the event of a serious accident in which vehicle cellular services may become disabled.

The invention claimed is:

1. A vehicle-to-everything (V2X) emergency message transmission system comprising:
   intelligent infrastructure configured to communicate with a vehicle via V2X communication;
   a telematics unit of the vehicle configured to communicate with the intelligent infrastructure via V2X communication, the telematics unit further comprises an emergency call unit that is located in a different location that the telematics unit;
   an emergency call system of the vehicle that is operable when the telematics unit is disabled and configured to detect a collision of the vehicle, generate a V2X emergency message based on detecting the collision, and transmit the V2X emergency message to the intelligent infrastructure by V2X communication separate from the telematics unit and when the telematics unit is disabled; and
   at least one or more sensors disposed within the vehicle that are configured to perform detection and localization of the vehicle, wherein the at least one or more sensors are in communication with both the emergency call unit and the emergency call system,
   wherein the intelligent infrastructure is configured to determine a type of object from among another vehicle, a pedestrian, and a bicycle in collision with the vehicle, modify the V2X emergency message from the emergency call system of the vehicle to include the type of the object, and transmit the modified V2X emergency message to emergency services.

2. The V2X emergency message transmission system of claim 1, wherein the modified V2X emergency message comprises information unknown by the vehicle or unavailable to be detected by sensors of the vehicle.

3. The V2X emergency message transmission system of claim 1, wherein the V2X emergency message comprises a first V2X emergency message based on detecting the collision and a second V2X emergency message based on detecting a secondary collision subsequent to the collision, wherein the intelligent infrastructure is configured to determine a second type of a second object from among another vehicle, a pedestrian, and a bicycle in secondary collision with the vehicle, modify the second V2X emergency message to include the second type of the second object, and transmit the modified second V2X emergency message to emergency services.

4. The V2X emergency message transmission system of claim 1, wherein the intelligent infrastructure is configured to replace the V2X emergency message and transmit the replaced V2X emergency message to emergency services.

5. The V2X emergency message transmission system of claim 4, wherein the replaced V2X emergency message comprises information unknown by the vehicle or unavailable to be detected by sensors of the vehicle.

6. The V2X emergency message transmission system of claim 5, wherein the intelligent infrastructure is further configured to continuously monitor the vehicle and surrounding area and to transmit multiple V2X emergency messages related to post crash or collision dynamics including whether pedestrians or passengers are exiting the vehicle or moving in a vicinity of the vehicle.

7. The V2X emergency message transmission system of claim 6, wherein the intelligent infrastructure is further configured to determine whether additional vehicles become involved in the vehicle collision as secondary collisions, and whether positions of the vehicle continue to change as a result of a secondary collision or environmental factors.

* * * * *